United States Patent
Hong et al.

(10) Patent No.: US 12,187,911 B2
(45) Date of Patent: Jan. 7, 2025

(54) METHOD FOR PREPARING WATER-SOLUBLE ACRYLIC-MODIFIED PHENOLIC-MODIFIED EPOXY RESIN, WATER-SOLUBLE ACRYLIC-MODIFIED PHENOLIC-MODIFIED EPOXY RESIN PREPARED THEREBY, AND AQUEOUS COATING COMPOSITION COMPRISING SAME

(71) Applicant: SAMHWA PAINTS INDUSTRIES CO., LTD., Ansan-si (KR)

(72) Inventors: Myeng Chan Hong, Gunpo-si (KR); Woo Jin Sohn, Seoul (KR); Jung Goo Park, Incheon (KR)

(73) Assignee: SAMHWA PAINTS INDUSTRIES CO., LTD., Ansan-Si (KR)

( * ) Notice: Subject to any disclaimer, the term of this patent is extended or adjusted under 35 U.S.C. 154(b) by 149 days.

(21) Appl. No.: 17/754,888

(22) PCT Filed: Oct. 8, 2020

(86) PCT No.: PCT/KR2020/013819
§ 371 (c)(1),
(2) Date: Apr. 14, 2022

(87) PCT Pub. No.: WO2021/075800
PCT Pub. Date: Apr. 22, 2021

(65) Prior Publication Data
US 2024/0117213 A1    Apr. 11, 2024

(30) Foreign Application Priority Data
Oct. 15, 2019  (KR) .................. 10-2019-0127859

(51) Int. Cl.
*C09D 163/00* (2006.01)
*B65D 65/42* (2006.01)
(Continued)

(52) U.S. Cl.
CPC .......... *C09D 163/00* (2013.01); *B65D 65/42* (2013.01); *C08F 220/06* (2013.01); *C08G 59/06* (2013.01); *C08G 59/14* (2013.01); *C08G 2150/90* (2013.01)

(58) Field of Classification Search
CPC ..... C09D 163/00; C08F 220/06; C08G 59/06; C08G 59/14; C08G 2150/90
See application file for complete search history.

(56) References Cited

U.S. PATENT DOCUMENTS

| | | | | |
|---|---|---|---|---|
| 2002/0086923 A1 * | 7/2002 | Noda | ................... | C09D 5/4434 524/236 |
| 2020/0062992 A1 * | 2/2020 | Kashiwakura | ........... | B05D 7/14 |

FOREIGN PATENT DOCUMENTS

| | | | | |
|---|---|---|---|---|
| EP | 3822260 A1 * | 5/2021 | ........... | C07D 305/00 |
| JP | 8-319339 A | 12/1996 | | |

(Continued)

OTHER PUBLICATIONS

International Search Report of PCT/KR2020/013819, Jan. 27, 2021, 6 pages.

*Primary Examiner* — Doris L Lee
(74) *Attorney, Agent, or Firm* — Lewis Roca Rothgerber Christie LLP

(57) ABSTRACT

According to the present invention, there are provided a preparation method of a water-soluble acryl-modified phenolic-modified epoxy resin including preparing an acrylic copolymer resin containing a carboxylic acid group; preparing a phenolic-modified epoxy resin by reacting an epoxy resin with a phenolic compound; preparing an acryl-modified phenolic-modified epoxy resin by ester-reacting the acrylic copolymer resin with the phenolic-modified epoxy resin; and preparing a water-soluble acryl-modified phenolic-modified epoxy resin by neutralizing the acryl-modified phenolic-modified epoxy resin, a water-soluble acryl-modi- (Continued)

fied phenolic-modified epoxy resin prepared thereby, and an aqueous paint composition including the same. According to the present invention, the water-soluble acryl-modified phenolic-modified epoxy resin and the aqueous coating composition including the same may be applied to most of conventional uses in which the epoxy resin is used due to excellent various physical properties. In addition, the formed coating film may be usefully applied as an aqueous coating composition for the inner surface of a two-piece can lid and the inner and outer surfaces of EOE due to excellent post-forming processibility, chemical stability in contents, and thermal stability at a high temperature.

14 Claims, 1 Drawing Sheet

(51) Int. Cl.
*C08F 220/06* (2006.01)
*C08G 59/06* (2006.01)
*C08G 59/14* (2006.01)

(56) References Cited

FOREIGN PATENT DOCUMENTS

| | | |
|---|---|---|
| JP | 2000-109750 A | 4/2000 |
| JP | 2003-268301 A | 9/2003 |
| JP | 2004-217858 A | 8/2004 |
| KR | 2002-0031086 A | 4/2002 |
| KR | 2002-0080034 A | 10/2002 |
| KR | 10-1011337 B1 | 1/2011 |
| KR | 10-2128261 B1 | 6/2020 |

* cited by examiner

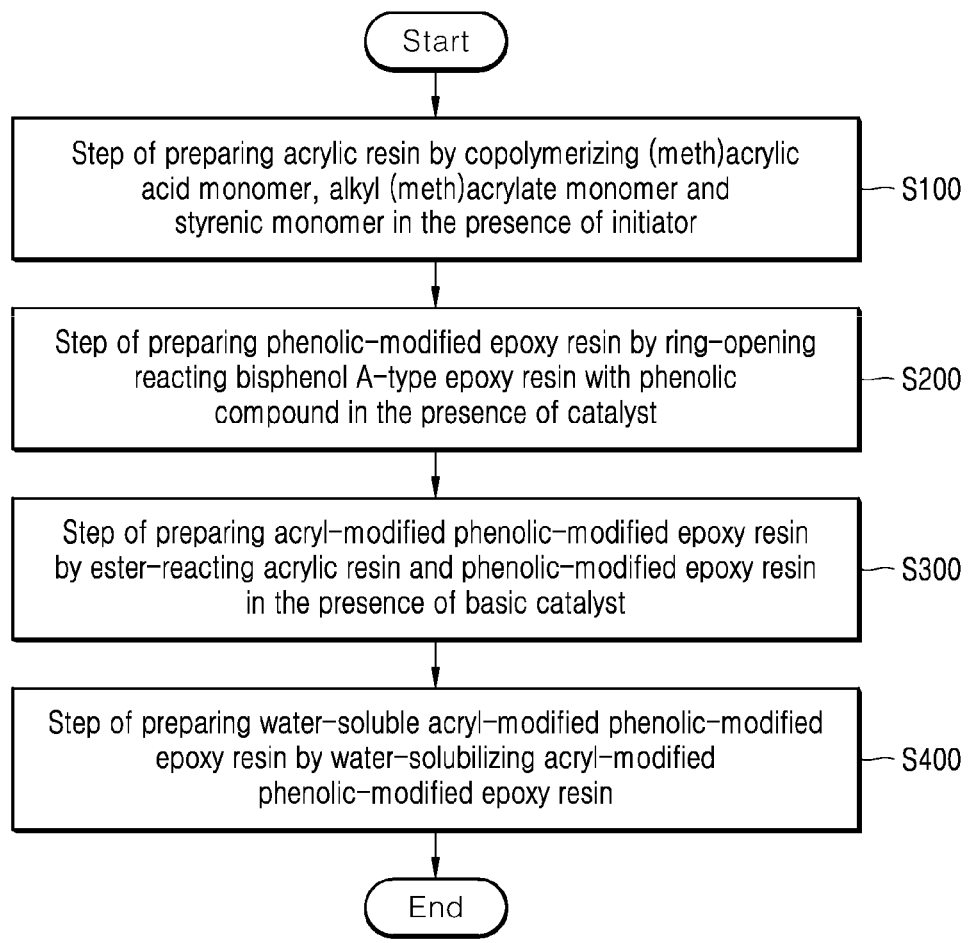

METHOD FOR PREPARING WATER-SOLUBLE ACRYLIC-MODIFIED PHENOLIC-MODIFIED EPOXY RESIN, WATER-SOLUBLE ACRYLIC-MODIFIED PHENOLIC-MODIFIED EPOXY RESIN PREPARED THEREBY, AND AQUEOUS COATING COMPOSITION COMPRISING SAME

CROSS-REFERENCE TO RELATED APPLICATIONS

This application is a U.S. National Phase Patent Application of International Application Number PCT/KR2020/013819, filed on Oct. 8, 2020, which claims priority of Korean Patent Application Number 10-2019-0127859, filed on Oct. 15, 2019, the entire content of each of which is incorporated herein by reference.

TECHNICAL FIELD

The present invention relates to a method for preparing a water-soluble acrylic-modified phenolic-modified epoxy resin, a water-soluble acrylic-modified phenolic-modified epoxy resin prepared thereby, and an aqueous coating composition comprising the same.

BACKGROUND ART

Epoxy resins have been widely used in adhesives, coatings, paint solvents, electronic circuit boards, etc. due to excellent heat resistance, chemical resistance, adhesion to materials, and water resistance.

When these epoxy resins are applied to a paint or coating, a formed coating film is required to have a high resistance to acid and alkali (chemical resistance), a high coating amount and a high solid content, and a low viscosity for easy coating.

The epoxy resins are mostly used with organic solvents, so workability is poor and environmental problems occur. Due to regulations on volatile substances (VOCs) that are emerging in society, the demand for water-soluble epoxy resins or aqueous epoxy resin compositions has been increased.

In general, an epoxy compound is hydrophobic, so it is difficult to make the epoxy compound water-soluble by itself, and the epoxy compound becomes water-soluble by introducing another water-soluble group into the compound. For example, aliphatic low-molecular glycidyl ether such as glycidyl ethers of glycol and polyhydric alcohol exhibits water-solubility, but aqueous solutions thereof have poor storage stability. For example, when an aqueous solution of glycerol glycidyl ether is left at 25° C. for 6 days, about 20% of an epoxy group is hydrolyzed at 40° C., about 60° C. Even if a hydrophobic epoxy resin is simply dispersed in water, the hydrophobic epoxy resin is very unstable and precipitated in a short time.

Methods for making the epoxy resin water-soluble may be divided into an external emulsification method and a self-emulsification method. The external emulsification method is a method of adding an appropriate emulsifier to water or a mixture of water and an organic solvent and dispersively emulsifying an epoxy resin therein. The self-emulsification method is a method of modifying an epoxy resin with a compound containing a hydrophilic group or a water-soluble group to dissolving or dispersively emulsifying the epoxy resin in water. Specifically, the epoxy resin may be water-solubilized as a polymer electrolyte by introducing an anionizable carboxylic acid group, a sulfonic acid group, or a cationizable amine group as a hydrophilic group into the epoxy resin and neutralizing the epoxy resin with a base or acid.

In a prior art, there is provided a method of making the epoxy resin water-soluble by polymerizing various acrylic monomers in a solution containing the epoxy resin to form an acrylic (co)polymer in the epoxy resin, but there is a problem that the epoxy resin is not sufficiently water-solubilized due to a high possibility that only the acrylic monomers are to be copolymerized.

In another prior art, there were attempts to water-solubilize an epoxy resin by performing an esterification reaction of a carboxyl group-containing acrylic (co)polymer with the epoxy resin together with a ring opening reaction in the presence of a catalyst. The water-solubilized epoxy resin has problems in that the viscosity is high, the amount of coating film is low during coating, and the chemical resistance is low.

In yet another prior art, a method of using an emulsifier has been described, but has the same problem as the aforementioned problem that the process is complicated and the viscosity is high.

In Patent Document 1 (Korean Patent Publication No. 10-2002-0080034, published on Oct. 23, 2002), there is disclosed an acryl-modified water-soluble epoxy resin composition for an inner surface of a food can prepared by reacting an epoxy resin and a carboxyl group-containing acrylic acid copolymer in the presence of a basic catalyst to prepare an acryl-modified epoxy ester resin by a ring opening reaction and an esterification reaction, and mixing the prepared acryl-modified epoxy ester resin with a water-soluble phenol resin as a curing agent. It is described that the composition has good scratch resistance, solvent resistance, retort testing and Previ testing results when applied to the inner surface of a can and may minimize environmental hormone-inducing substances.

In Patent Document 2 (Korean Patent Registration No. 10-1011337, issued on Jan. 28, 2011), there is disclosed a water-soluble acryl-modified epoxy ester resin composition by esterifying and binding an unsaturated group-containing fatty acid to an epoxy resin and adding and polymerizing a vinyl monomer and an acrylic acid monomer thereto. It is described that a paint including the resin composition may form a coating film having excellent corrosion resistance, water resistance, drying properties, etc.

However, in the prior arts and the methods of Patent Documents 1 and 2, there are limitations in producing a water-soluble epoxy compound having a low viscosity, a high coating amount, and high chemical resistance, and the development thereof has been required.

DISCLOSURE

Technical Problem

An object of the present invention is to provide a water-soluble acryl-modified epoxy resin composition having a low viscosity and a high solid content by modifying an epoxy resin with an acrylic resin and develop an aqueous paint composition having a high coating amount and excellent chemical resistance using the same.

The objects to be solved by the present invention are not limited to the aforementioned object(s), and other object(s), which are not mentioned above, will be apparent to those skilled in the art from the following description.

Technical Solution

In order to solve the problems, the present invention provides a preparation method of a water-soluble acryl-modified phenolic-modified epoxy resin including the following steps:

(Step 1) preparing an acrylic resin by copolymerizing a (meth)acrylic acid monomer, an alkyl (meth)acrylate monomer and a styrenic monomer in the presence of an initiator;

(Step 2) preparing a phenolic-modified epoxy resin by ring-opening reacting a bisphenol A-type epoxy resin with a phenolic compound in the presence of a catalyst;

(Step 3) preparing an acryl-modified phenolic-modified epoxy resin by ester-reacting the acrylic resin and the phenolic-modified epoxy resin in the presence of a basic catalyst; and (Step 4) preparing a water-soluble acryl-modified phenolic-modified epoxy resin by neutralizing the acryl-modified phenolic-modified epoxy resin.

According to an embodiment of the present invention, in Step 1, the (meth)acrylic acid monomer is at least one selected from the group consisting of acrylic acid, methacrylic acid and crotonic acid;

the alkyl (meth)acrylate monomer is at least one selected from the group consisting of methyl (meth)acrylate, ethyl (meth)acrylate, 2-hydroxyethyl (meth)acrylate, propyl (meth)acrylate, 2-hydroxypropyl (meth)acrylate, butyl (meth)acrylate, glycidyl (meth)acrylate, trimethoxysilylpropyl (meth)acrylate, triethoxysilylpropyl (meth)acrylate, and tributoxysilylpropyl (meth)acrylate; and the styrenic monomer is at least one selected from the group consisting of styrene, vinyltoluene, vinylbenzoic acid, ethyl aminostyrene, alpha-methylvinylbenzoic acid, p-vinylbenzenesulfonic acid, and p-vinylbenzenesulfonic acid sodium salt.

According to an embodiment of the present invention, in Step 1, 40 to 60 wt % of methacrylic acid, 5 to 20 wt % of methyl methacrylate, 5 to 20 wt % of butyl acrylate and 10 to 30 wt % of styrene may be copolymerized.

According to an embodiment of the present invention, in Step 1, the acrylic resin may be a weight average molecular weight selected in the range of 1,000 to 10,000.

According to an embodiment of the present invention, in Step 2, the bisphenol A type epoxy resin may have an epoxy equivalent selected from the range of 1,000 to 5,000.

According to an embodiment of the present invention, in Step 2, the phenolic compound may be at least one selected from the group consisting of phenol, nonylphenol, 3-(dimethylamino)phenol, 2-(methylamino)phenol, 4-(methylmercapto)phenol, 4-(trifluoromethyl)phenol, 4-(benzyloxy)phenol, 3-(trifluoromethyl)phenol, 4-nitro-3-(trifluoromethyl)phenol, 2-(2-hydroxyethoxy)phenol, 4-(2-methoxyethyl)phenol, (dimethylaminoethyl)phenol, 4-(hexyloxy)phenol, 2-(2-phenylethyl)phenol, 4-(octyloxy)phenol, 2-(4-morpholinylmethyl)phenol, 4-(1,1-dimethylhexyl)phenol, 2-(1-pyrrolidinyl)phenol, 2-(benzyloxy)phenol, 4-(1,1-dimethyloctyl)phenol, 4-(2-naphthyl)phenol, 2-(trifluoromethoxy)phenol, and 4-(trifluoromethoxy)phenol.

According to an embodiment of the present invention, in Step 2, the phenolic compound may be used in an amount of 10 to 50 mol % based on the epoxy equivalent of the epoxy resin.

According to an embodiment of the present invention, in Step 3, the acrylic resin and the phenolic-modified epoxy resin may be used in a weight ratio of 40:60 to 5:95 based on the solid content.

According to an embodiment of the present invention, in Step 3, a carboxylic acid group derived from the (meth)acrylic acid monomer of the acrylic resin may be ester-linked with a hydroxyl group derived from the epoxy group of the phenolic-modified epoxy resin.

According to an embodiment of the present invention, in Step 4, the water-solubilizing may be performed by adding and neutralizing a base in an amount of 40 to 90 mol % of the residual carboxylic acid.

According to an embodiment of the present invention, the base may be at least one selected from the group consisting of triethylamine, tripropylamine, tributylamine, N,N-dimethylethanolamine, N,N-diisopropylmethylamine, N,N-diisopropylethylamine, 2-amino-2-methylpropanol, 2-amino-2-ethyl-1,3-propanediol, 2-dimethylamino-2-methylpropanol, pyrrolidine, imidazole, 1-methylimidazole, 1,8-diazabicyclo[5,4,0]unde-7-cene, 1,5-diazabicyclo[4,3,0]non-5-ene, 2-etoxyhexylamine, bis(2-ethylhexyl)amine, tetrabutylphosphonium bromide, dodecyldimethylamine, N,N-dimethylbenzylamine, 2-ethylimidazole, tetramethylguanidine, benzyltrimethylammonium bromide, benzyltrimethylammonium hydroxide, and tetrabutylammonium hydroxide.

According to an embodiment of the present invention, there may be provided a water-soluble acryl-modified phenolic-modified epoxy resin prepared according to the preparation method described above.

According to an embodiment of the present invention, there may be provided an aqueous coating composition comprising the water-soluble acryl-modified phenolic-modified epoxy resin described above.

According to an embodiment of the present invention, the aqueous coating composition may be applied to an inner surface or inner and outer surfaces of a can lid.

Advantageous Effects

According to the present invention, the water-soluble acryl-modified phenolic-modified epoxy resin and the aqueous coating composition including the same may be applied to most of conventional uses in which the epoxy resin is used, due to excellent various physical properties. In addition, the formed coating film may be usefully applied as an aqueous coating composition for the inner surface of a two-piece can lid and the inner and outer surfaces of EOE due to excellent post-forming processibility, chemical stability in contents, and thermal stability at a high temperature.

It should be understood that the effects of the present invention are not limited to the effects, but include all effects that can be deduced from the detailed description of the present invention or configurations of the present invention described in appended claims.

DESCRIPTION OF DRAWINGS

FIG. 1 is a process flowchart for an exemplary embodiment of a preparation method of a water-soluble acryl-modified phenolic-modified epoxy resin according to the present invention.

BEST MODE FOR THE INVENTION

Before describing the present invention in detail, terms or words used in the present disclosure should not be construed as unconditionally limited to a conventional or dictionary meaning, and the inventors of the present invention can appropriately define and use the concept of various terms in order to describe their invention in the best method. Furthermore, it should be understood that these terms or words should be interpreted as meanings and concepts consistent with the technical idea of the present invention.

That is, the terms used in the present disclosure are only used to describe a preferred embodiment of the present invention, and are not intended to specifically limit the contents of the present invention, and it should be noted that these terms are terms defined in consideration with various possibilities of the present invention.

In addition, in the present disclosure, it should be understood that the singular expression may include a plural expression unless clearly indicated in another meaning in the context, and even if similarly expressed in the plural, the singular expression may include the meaning of the singular number.

Throughout the present disclosure, when a component is described as "including" the other component, the component does not exclude any other component, but may further include any other component unless otherwise indicated in contrary.

Further, hereinafter, in the following description of the present invention, a detailed description of a configuration determined to unnecessarily obscure the subject matter of the present invention, for example, known technologies including the related arts may be omitted.

Hereinafter, the present invention will be described in more detail with reference to the drawings.

When conceptually describing a process sequence of a preparation method of the present invention to help the understanding of the present invention, a water-soluble acryl-modified phenolic-modified epoxy resin may be prepared by processes of preparing a carboxylic acid group-containing acrylic resin by copolymerizing a carboxylic acid group-containing acrylic monomer and another acrylic monomer; preparing a phenolic-modified epoxy resin by reacting an epoxy resin with a phenolic compound; preparing an acryl-modified phenolic-modified epoxy resin by ester-linking the carboxylic acid group-containing acrylic resin and the phenolic-modified epoxy resin; and water-solubilizing the acryl-modified phenolic-modified epoxy resin.

Accordingly, FIG. 1 illustrates a process flowchart for an exemplary embodiment of a preparation method of a water-soluble acryl-modified phenolic-modified epoxy resin according to the present invention.

According to FIG. 1, the water-soluble acryl-modified phenolic-modified epoxy resin according to the present invention may be prepared by the method including the following steps:

(Step 1) preparing an acrylic resin by copolymerizing a (meth)acrylic acid monomer, an alkyl (meth)acrylate monomer and a styrenic monomer in the presence of an initiator (S100);

(Step 2) preparing a phenolic-modified epoxy resin by ring-opening reacting a bisphenol A-type epoxy resin with a phenolic compound in the presence of a catalyst (S200);

(Step 3) preparing an acryl-modified phenolic-modified epoxy resin by ester-reacting the acrylic resin and the phenolic-modified epoxy resin in the presence of a basic catalyst (S300); and (Step 4) preparing a water-soluble acryl-modified phenolic-modified epoxy resin by water-solubilizing the acryl-modified phenolic-modified epoxy resin (S400).

(1) Preparation of Water-Soluble Acrylic Resin

In the present invention, S100 (Step 1) is a step of preparing an acrylic copolymer by copolymerizing acrylic monomers.

In step S100, the acrylic resin is prepared by adding a (meth)acrylic acid monomer, an alkyl (meth)acrylate monomer and a styrenic monomer to a solvent, and (randomly) copolymerizing the monomers in the presence of an initiator.

In an embodiment of the present invention, the copolymerization reaction may be performed at a temperature of 70 to 130° C., preferably 80 to 100° C. for 1 hour to 4 hours, preferably 1.5 hours to 3.5 hours, more preferably 2 hours to 3 hours. If the reaction time is less than 1 hour, due to the heat of the acrylic monomer, it is difficult to control the temperature, and unreacted monomers remain, which is not good. If the reaction time exceeds 4 hours, the molecular weight of the acrylic resin becomes large to cause a problem in the viscosity of final water-soluble epoxy, and there is a risk of popping in the coating film.

The solvent used for the (random) copolymerization reaction is not particularly limited, but may be at least one selected from the group consisting of n-butanol, i-propanol, ethyl cellosolve, butyl cellosolve, and ethyl carbitol, and may be selected from, for example, a mixed solvent of butanol, butyl cellosolve and butyl carbitol, more preferably a mixed solvent of butanol and butyl cellosolve.

As a specific example of performing the copolymerization reaction, the copolymerization reaction is terminated by adding butanol and butyl cellosolve as a solvent in a reaction tank (reaction container) to increase the temperature to 120° C., adding and mixing methacrylic acid, styrene, methyl methacrylate, butyl acrylate as monomers and benzoyl peroxide as an initiator in a dropping tank (dropping container), dropping a mixture in a feeding tank into the reaction tank for 2 to 4 hours, decreasing the temperature to 70° C. when the dropping is completed, and additionally dropping butyl cellosolve as the solvent to dilute a reaction solution.

In an embodiment of the present invention, the (meth)acrylic acid monomer may be at least one selected from the group consisting of acrylic acid, methacrylic acid and crotonic acid, preferably methacrylic acid;

the alkyl (meth)acrylate monomer may be at least one selected from the group consisting of methyl (meth)acrylate, ethyl (meth)acrylate, 2-hydroxyethyl (meth)acrylate, propyl (meth)acrylate, 2-hydroxypropyl (meth)acrylate, butyl (meth)acrylate, glycidyl (meth)acrylate, trimethoxysilylpropyl (meth)acrylate, triethoxysilylpropyl (meth)acrylate, and tributoxysilylpropyl (meth)acrylate, preferably methyl methacrylate and butyl acrylate; and the styrenic monomer may be at least one selected from the group consisting of styrene, vinyltoluene, vinylbenzoic acid, ethyl aminostyrene, alpha-methylvinylbenzoic acid, p-vinylbenzenesulfonic acid, and p-vinylbenzenesulfonic acid sodium salt, preferably styrene.

In addition to the above-mentioned monomers, the acrylic resin may further include one or more vinyl-based monomers and other monomers in some cases. The vinyl monomer that may be used may be at least one selected from the group consisting of vinyl acetate, vinyl butyrate, vinyl benzoate, vinyl chloride, vinyl fluoride, vinyl bromide, N-vinylpyrrolidone, N-vinylpyrrolidone, N-vinylcarbazole, butadiene, isoprene, and chloroprene; and other monomers that may be used may be at least one selected from the group consisting of acrylamide, maleic anhydride, N-phenylmaleimide, N-butylmaleimide, and phenylmaleimide.

In an embodiment of the present invention, the acrylic resin is a copolymer prepared from 30 to 80 wt % of the (meth)acrylic acid monomer, 10 to 30 wt % of the styrenic monomer, and 10 to 40 wt % of the alkyl (meth)acrylate monomer.

For example, the acrylic resin may be a copolymer prepared from 30 to 80 wt % of methacrylic acid, 10 to 30 wt % of styrene, 5 to 20 wt % of methyl methacrylate, and 5 to 20 wt % of butyl acrylate.

The methacrylic acid may be used in the range of 30 to 80 wt %, preferably 40 to 60 wt %. Out of the above range, for example, if the methacrylic acid is used in less than 30 wt %, the reaction with the esterification reaction with epoxy becomes slow, and there is a difficulty in water solubility. If the methacrylic acid exceeds 80 wt %, the epoxy and the carboxyl group react with each other and then the carboxyl group remains, so that an excess of base is required for water solubility, resulting in an increase of viscosity.

The styrene may be used in the range of 10 to 30 wt %, preferably 15 to 25 wt %. Out of the above range, for example, if the styrene is less than 10 wt %, after the styrene is cured with a water-soluble epoxy compound to form a coating film, the chemical resistance becomes poor, and if the styrene exceeds 30 wt %, the viscosity of the acrylic resin increases to simultaneously increase the viscosity of the water-soluble epoxy.

The methyl methacrylate and the butyl acrylate may be used in the range of 5 to 20 wt %, preferably 10 to 15 wt %, respectively. Out of the above range, for example, if the methyl methacrylate and the butyl acrylate are less than 5 wt %, there is a problem that the glass transition temperature of the overall acrylic resin increases and popping occurs when forming the final coating film, and if the methyl methacrylate and the butyl acrylate are more than 20 wt %, the water-soluble epoxy resin becomes hydrophobic, so that there is a problem in compatibility.

According to a preferred embodiment of the present invention, the acrylic resin may have a structure of Chemical Formula 1 below;

[Chemical Formula 1]

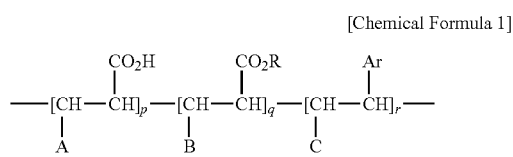

(In Chemical Formula 1, A, B and C independently represent hydrogen, an alkyl group or a hydroxyalkyl group, Ar represents a substituted or unsubstituted phenyl group, and p, q and r are the mole fractions of each monomer, p+q+q is 1 or less)

According to an embodiment of the present invention, the acrylic resin may have a weight average molecular weight of 1,000 to 10,000, preferably 2,000 to 8,000, and more preferably 4,000 to 6,000.

In an embodiment of the present invention, the copolymerization reaction may be performed in the presence of an initiator, and the initiator may be added in an amount of 2 to 10 wt %, preferably 4 to 7 wt %, based on the total amount of the monomers. Out of the above range, for example, if the initiator is less than 4 wt %, the molecular weight of the acrylic resin becomes large, and when water-soluble epoxy is prepared and then applied to coating, a popping phenomenon occurs, and if the initiator exceeds 7 wt %, an acrylic resin having a small molecular weight is prepared, so that in S300 (step 3), a relatively larger amount of acryl is required, which is not economical.

The initiator is not particularly limited, but may be at least one selected from the group consisting of benzoyl peroxide, acetyl peroxide, dilauryl peroxide, cumyl peroxide, 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbanitrile), 2-(t-butylazo)-2-cyanopropane, 2,2'-azobis{2-methyl-N-[1,1-bis(hydroxymethyl)-2-hydroxyethyl]propionamide}, t-butylperoxyneodecanoethite, t-butyl peroxyacetate, t-amyl peroxypivalate, t-butyl peroxypivalate, di-isopropyl peroxydicarbonate, dicyclohexyl peroxydicarbonate, potassium peroxydisulfate, ammonium peroxydisulfate, di-t-butyl hyponitrite, and dicumyl hyponitrite, preferably benzoyl peroxide.

(2) Preparation of Phenolic-Modified Epoxy Resin

In the present invention, step S200 (step 2) is a step of preparing the phenolic-modified epoxy resin by reacting the epoxy resin with the phenolic compound. In the present invention, the term "phenolic-modified" refers to a phenolic compound, and for example, means that a hydroxyl group of substituted or unsubstituted phenol forms an ether bond with a hydroxyl group derived from an epoxy group of an epoxy resin.

In step S200, the phenolic-modified epoxy resin is prepared by ring-opening reacting a bisphenol A-type epoxy resin with a phenolic compound in the presence of a catalyst.

Specifically, by ring-opening reacting an epoxy group of the bisphenol A-type epoxy resin with a hydroxyl group of the phenolic compound in the presence of the catalyst, one of two hydroxyl groups generated by the ring-opening reaction of the epoxy group remains as an unreacted hydroxyl group, the other hydroxyl group reacts with a phenol group to form a phenolic-modified epoxy resin or a phenolic-etherified epoxy resin.

According to an embodiment of the present invention, the ring-opening reaction of step S200 may be performed at a temperature of 80 to 170° C., preferably 100 to 150° C. for 30 minutes to 5 hours, preferably 1 hour to 2 hours. Out of the above range, for example, if the temperature is less than 80° C., the reaction does not proceed, and if the temperature is more than 170° C., the viscosity increases rapidly, so that an effective reaction cannot proceed in the reaction with acryl. In addition, if the time is less than 30 minutes, the reaction is not completed and if the time exceeds 2 hours, the viscosity increases, resulting in an increase in the viscosity of the final water-soluble epoxy.

According to an embodiment of the present invention, the phenolic compound may be used in an amount of 10 to 50 mol %, preferably 20 to 40 mol %, based on an epoxy equivalent of the epoxy resin. Out of the above range, for example, if the phenolic compound is less than 20 mol %, an effect of modifying the epoxy is not exhibited, and if the phenolic compound is more than 40 mol %, in the reaction of esterifying epoxy and acryl, the reaction time is increased, which is not economical, and the molecular weight of the final water-soluble epoxy increases, so that the precipitation may occur over time.

The phenolic compound may be at least one selected from the group consisting of phenol, nonylphenol, 3-(dimethylamino)phenol, 2-(methylamino)phenol, 4-(methylmercapto) phenol, 4-(trifluoromethyl)phenol, 4-(benzyloxy)phenol, 3-(trifluoromethyl)phenol, 4-nitro-3-(trifluoromethyl)phenol, 2-(2-hydroxyethoxy)phenol, 4-(2-methoxyethyl)phenol, (dimethylaminoethyl)phenol, 4-(hexyloxy)phenol, 2-(2-phenylethyl)phenol, 4-(octyloxy)phenol, 2-(4-morpholinylmethyl)phenol, 4-(1,1-dimethylhexyl)phenol, 2-(1-pyrrolidinyl)phenol, 2-(benzyloxy)phenol, 4-(1,1-dimethyloctyl)phenol, 4-(2-naphthyl)phenol, 2-(trifluoromethoxy) phenol, and 4-(trifluoromethoxy)phenol.

In another embodiment of the present invention, benzoyl ester may also be formed with a hydroxyl group derived from an epoxy group using a benzoic acid-based compound instead of the phenolic compound. The benzoic acid-based compound to be used may be at least one selected from the group consisting of benzoic acid, 3-(dimethylamino)benzoic acid, 4-(dimethylamino)benzoic acid, 4-(4-methylphenoxy) benzoic acid, 4-(trifluoromethyl)benzoic acid, 4-(diphenylphosphino)benzoic acid, 4-(nonyloxy)benzoic acid, 4-(undecyloxy)benzoic acid, 4-(2-furoylamino)benzoic acid, 2-hydroxy-4-(2-hydroxyethoxy)benzoic acid, and 4-piperidin-1-yl-benzoic acid.

According to an embodiment of the present invention, the catalyst used in step S200 may be used in an amount of 0.1 to 0.5 mol %, preferably 0.2 to 0.4 mol %, based on an equivalent of the epoxy resin. Out of the above range, for example, if the catalyst is less than 0.2 mol %, the reaction rate is slow, which is not economical, and if the catalyst exceeds 0.4 mol %, the reaction proceeds by itself with phenol or alcohol remaining in the epoxy resin, and the molecular weight of the epoxy resin is increased to affect the viscosity of the final water-soluble epoxy resin, which is not good.

The catalyst used in step S200 may be at least one selected from the group consisting of triethylamine, tripropylamine, tributylamine, N,N-dimethylethanolamine, N,N-diisopropylmethylamine, N,N-diisopropylethylamine, 2-amino-2-methylpropanol, 2-amino-2-ethyl-1,3-propanediol, 2-dimethylamino-2-methylpropanol, pyrrolidine, imidazole, 1-methylimidazole, 1,8-diazabicyclo[5,4,0]unde-7-cene, 1,5-diazabicyclo[4,3,0]non-5-ene, 2-etoxyhexylamine, bis (2-ethylhexyl)amine, tetrabutylphosphonium bromide, dodecyldimethylamine, N,N-dimethylbenzylamine, 2-ethylimidazole, tetramethylguanidine, benzyltrimethylammonium bromide, benzyltrimethylammonium hydroxide and tetrabutylammonium hydroxide, but is not limited thereto.

According to an embodiment of the present invention, the bisphenol A epoxy resin generally refers to an epoxy resin obtained through a reaction of bisphenol A and epichlorohydrin in the presence of an alkali, and an epoxy equivalent may be selected in the range of 1,000 to 5,000, preferably 2,000 to 4,000, preferably from 2,500 to 3,500.

A representative bisphenol A type epoxy resin is a bisphenol A type epoxy resin of the following Chemical formula 2.

[Chemical Formula 2]

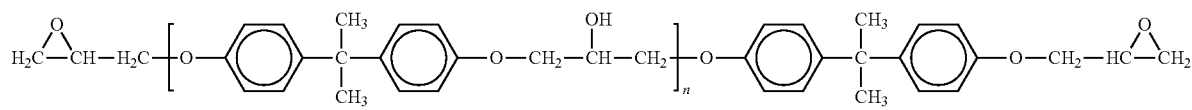

(In Chemical Formula 2, n represents the number of repeating units)

In Chemical Formula 2, the number of repeating units is not particularly limited, and the epoxy equivalent may be selected to be in the range of 1,000 to 5,000, or the weight average molecular weight may be selected to be in the range of 5,000 to 7,000.

The bisphenol A epoxy resin may use commercially available products, and may use, for example, YD-011, YD-012, YD-014, YD-017, YD-019, YD-019K, YD-020, YD-020L, etc. commercially available from Kukdo Chemical Co., Ltd., preferably YD-019.

According to an embodiment of the present invention, when the bisphenol A-type epoxy resin of Chemical Formula 2 reacts with a phenol compound, a phenolic-modified epoxy resin of Chemical Formula 3 below may be prepared:

[Chemical Formula 3]

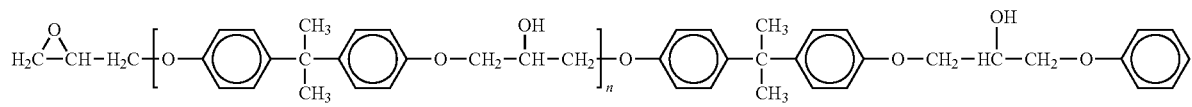

(In Chemical Formula 3, wherein, n represents the same meaning as described above)

In Chemical Formula 3, although it is illustrated that the phenol group is added to 1-position (terminal position) of a 1,2-epoxy group, it is also observed that the phenol group is added to 2-position in a not small amount, and this case is also included in the present invention.

In addition, the reaction of step S200 may be performed under at least one mixed solvent selected from the group consisting of butanol, isopropanol, butyl cellosolve, ethyl cellosolve, hexyl cellosolve, butyl carbitol, and ethyl carbitol, preferably a mixture of butanol, butyl cellosolve, and butyl carbitol, and more preferably hexyl cellosolve, but is not limited thereto.

As a specific example of performing step S300, the copolymerization reaction obtains a product, for example, by introducing an epoxy resin (e.g., YD-019) and hexyl carbitol as a solvent to a reaction tank (reaction container), completely dissolving the mixture by raising the temperature to 130° C., adding nonylphenol and triphenylphosphine, performing the reaction by stirring for 1 hour, and lowering the temperature to room temperature when the reaction is completed.

(3) Preparation of Acryl-Modified Phenolic-Modified Epoxy Resin

In the present invention, step S300 (Step 3) is a step of preparing an acryl-modified and phenolic-modified epoxy resin by reacting a phenolic-modified epoxy resin with an acrylic resin.

In step S300, the acrylic resin prepared in step S100 and the phenolic-modified epoxy resin prepared in step S200 are subjected to an esterification reaction in the presence of a basic catalyst to prepare an acryl-modified phenolic-modified epoxy resin.

In step S300, a carboxylic acid group derived from a (meth)acrylic acid monomer of the acrylic resin and a hydroxyl group derived from an epoxy group of the phenolic-modified epoxy resin are ester-linked so that the acrylic resin and the phenolic-modified epoxy resin are ester-linked to prepare an acryl-modified phenolic-modified epoxy resin.

According to an embodiment of the present invention, in step S300, the acrylic resin and the phenolic-modified epoxy resin are used in a weight ratio of 40:60 to 5:95, preferably 30:70 to 10:90 based on the solid content. Out of the above range, for example, when the weight ratio is less than 40:60, after carboxylic acid of the acrylic resin is ester-linked with a hydroxyl group of the epoxy resin, the amount of residual carboxylic acid increases and the amount of base for neutralization thereof increases, thereby increasing the viscosity of the final product resin. When the weight ratio is more than 5:95, after the carboxylic acid of the acrylic resin is ester-linked with the hydroxyl group of the epoxy resin, the amount of residual carboxylic acid decreases, and precipitation occurs over time after neutralization thereof, thereby causing a problem in storage stability of the final product resin.

In step S300, the reaction may be performed at 70 to 120° C., more preferably at 80 to 100° C., and preferably for 1 hour to 5 hours, more preferably for 1.5 hours to 3 hours. Out of the above range, for example, in the case of less than 70° C., the reaction rate is slow, which is not economical, and in the case of more than 120° C., the reaction rate is fast and as a result, there is a disadvantage that it is not easy to control.

The basic catalyst used in step S300 may be at least one selected from the group consisting of triethylamine, tripropylamine, tributylamine, N,N-dimethylethanolamine, N,N-diisopropylmethylamine, N,N-diisopropylethylamine, 2-amino-2-methylpropanol, 2-amino-2-ethyl-1,3-propanediol, 2-dimethylamino-2-methylpropanol, pyrrolidine, imidazole, 1-methylimidazole, 1,8-diazabicyclo[5,4,0]unde-7-cene, 1,5-diazabicyclo[4,3,0]non-5-ene, 2-etoxyhexylamine, bis(2-ethylhexyl)amine, tetrabutylphosphonium bromide, dodecyldimethylamine, N,N-dimethylbenzylamine, 2-ethylimidazole, tetramethylguanidine, benzyltrimethylammonium bromide, benzyltrimethylammonium hydroxide, and tetrabutylammonium hydroxide.

According to an embodiment of the present invention, when the phenolic-modified epoxy resin of Chemical Formula 3 reacts with the acrylic resin, the acryl-modified phenolic-modified epoxy resin of Chemical Formula 4 may be prepared:

[Chemical Formula 4]

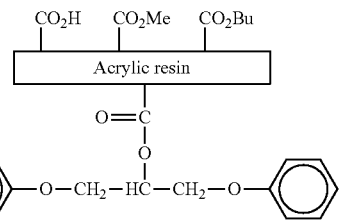
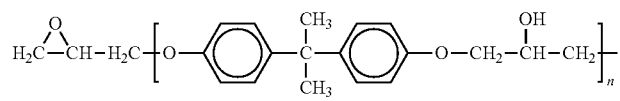

(In Chemical Formula 4, n represents the same meaning as described above)

In the present invention, in some cases, that is, under an acidic reaction condition, the carboxylic acid group of the acrylic resin may react with the epoxy group of the epoxy resin to perform the ring opening reaction, but under a basic reaction condition, the carboxylic acid group is converted to a carboxylate group, so that the reactivity with the epoxy group is almost eliminated. Accordingly, the acryl-modified phenolic-modified epoxy resin may significantly increase in storage stability under a basic condition.

In a specific example of performing step S300, the acryl-modified phenolic-modified epoxy resin of Chemical Formula 4 may be prepared by mixing the acrylic resin of Chemical Formula 1 and the phenolic-modified epoxy resin of Chemical Formula 3 in a solvent, adding a basic catalyst, increasing the temperature of the reaction mixture to 90° C., and dropping N,N-dimethylethanolamine as a basic catalyst and stirring for 2 hours.

(4) Preparation of Water-Soluble Acryl-Modified Phenolic-Modified Epoxy Resin

In the present invention, step S400 (Step 4) is a step of preparing a water-soluble acryl-modified phenolic-modified epoxy resin by water-solubilizing the acryl-modified phenolic-modified epoxy resin.

In step S400, by adding a base to the acryl-modified phenolic-modified epoxy resin prepared in step S300 to neutralize the residual carboxylic acid group, the acryl-modified phenolic-modified epoxy resin may be water-solubilized. The water-soluble acryl-modified phenolic-modified epoxy resin prepared above has high storage stability because its solubility in water is increased so that precipitation is not formed even during long-term storage.

According to an embodiment of the present invention, in step S400, the base may be used in an amount of 40 to 90 mol %, preferably 50 to 80 mol % of the residual carboxylic acid. Out of the above range, for example, if the base is less than 40 mol %, the carboxylic acid is not sufficiently neutralized and precipitation occurs over time, and if the base exceeds 90 mol %, the viscosity of the final water-soluble epoxy compound increases.

The base that may be used in step S400 may be at least one selected from the group consisting of triethylamine, tripropylamine, tributylamine, N,N-dimethylethanolamine, N,N-diisopropylmethylamine, N,N-diisopropylethylamine, 2-amino-2-methylpropanol, 2-amino-2-ethyl-1,3-propanediol, 2-dimethylamino-2-methylpropanol, pyrrolidine, imidazole, 1-methylimidazole, 1,8-diazabicyclo[5,4,0]unde-7-cene, 1,5-diazabicyclo[4,3,0]non-5-ene, 2-etoxyhexylamine, bis(2-ethylhexyl)amine, tetrabutylphosphonium bromide, dodecyldimethylamine, N,N-dimethylbenzylamine, 2-ethylimidazole, tetramethylguanidine, benzyltrimethylammonium bromide, benzyltrimethylammonium hydroxide, and tetrabutylammonium hydroxide, preferably N,N-dimethylethanolamine.

In step S400, the neutralization reaction may be performed at a temperature of 30 to 90° C., more preferably 40 to 80° C., for 10 minutes to 50 minutes, preferably for 20 minutes to 40 minutes. Out of the above range, for example, if the temperature is less than 30° C., it is not effectively mixed with the base, and if the temperature is more than 90° C., the reaction proceeds further due to the neutralized base, resulting in an increase in viscosity.

On the other hand, since the water-soluble acryl-modified phenolic-modified epoxy resin prepared in step S400 has excellent water solubility, there is another advantage that its solid content and/or viscosity may be properly adjusted by simply adding water.

According to an embodiment of the present invention, in the water-soluble acryl-modified phenolic-modified epoxy resin obtained in step S400, a melamine resin (e.g., Cymel 370, American Cyanamid. Co) may be added in an amount of 5 to 15 wt %, preferably 8 to 12 wt % based on the solid content.

(5) Aqueous Coating Composition

The epoxy resin has been widely used in adhesives, coatings, paint solvents, electronic circuit boards, etc. due to excellent heat resistance, chemical resistance, adhesion to materials, and water resistance, but is used as an oil-based paint due to its low solubility in water to cause environmental problems and limit the scope of application.

The water-soluble acryl-modified phenolic-modified epoxy resin according to the present invention and the aqueous coating composition including the same may be applied to most of conventional uses using the epoxy resin due to excellent adhesion, processibility, solvent resistance, chemical resistance, water resistance, scratch resistance, heat resistance, etc., and particularly, may be useful as a paint composition for an inner surface of a food can.

The water-soluble acryl-modified phenolic-modified epoxy resin according to the present invention and the aqueous paint composition including the same may be usefully applied as an aqueous paint composition for inner and outer surfaces of a two-piece can lid and inner and outer surfaces of easy-open-end (EOE) because a coating film formed therefrom has excellent post-forming processibility, excellent chemical stability for contents with various acidities and basicities, and excellent thermal stability that is not affected by contents even in a high-temperature environment.

Modes for the Invention

Hereinafter, the present invention will be described in more detail with reference to Examples. However, the following Examples are for explaining the present invention in more detail, and the scope of the present invention is not limited by the following Examples. The following Examples can be appropriately modified and changed by those skilled in the art within the scope of the present invention.

EXAMPLES

Example 1

Step 1: Preparation of Acrylic Resin

In a reaction tank (reaction container), 330 kg of butanol and 330 kg of hexyl cellosolve were added, and a temperature was raised to 120° C.

In a dropping tank (dropping container), 180 kg of methacrylic acid, 30 kg of methyl methacrylate, 80 kg of butyl acrylate, 80 kg of styrene, and 2 kg of benzoyl peroxide were added and mixed.

In the reaction tank (reaction container), the mixture of the dropping tank was dropped while stirring for about 2 hours, further stirred for 1 hour, and then the temperature was lowered to room temperature to obtain an acrylic resin.

Step 2: Preparation of Nonylphenol-Modified Epoxy Resin

In the reaction tank (reaction container), a bisphenol A-type epoxy resin (YD-019, manufactured by Kukdo Chemical Co., Ltd.) and 200 kg of hexyl carbitol were added, and the temperature was slowly increased to 130° C., and then the epoxy resin obtained in Step 1 was added. When the epoxy resin was completely dissolved, 3 kg of nonylphenol and 0.3 kg of triphenylphosphine were added and stirred for 1 hour, and then the temperature was lowered to room temperature to obtain a nonylphenol-modified epoxy resin.

Step 3: Preparation of Acryl-Modified Nonylphenol-Modified Epoxy Resin

In the reaction tank (reaction container), 170 kg of the acrylic resin obtained in Step 1 and 500 kg of the nonylphenol-modified epoxy resin obtained in Step 2 were added, and the temperature was raised to 90° C.

In the dropping tank (dropping container), 6.3 kg of N,N-dimethylethanolamine and 40 kg of ion-exchanged water were added and mixed.

In the reaction tank (reaction container), the mixture of the dropping tank was dropped while slowly stirring for about 30 minutes, further stirred for 2 hours after completion of the dropping to obtain a mixture containing the acryl-modified nonylphenol-modified epoxy resin.

Step 4: Preparation of Water-Soluble Acryl-Modified Nonylphenol-Modified Epoxy Resin The mixture containing the acryl-modified nonylphenol-modified epoxy resin obtained in Step 3 was lowered to the temperature of 50° C., a solution of 4.2 kg of N,N-dimethylethanolamine dissolved in 10 kg of deionized water was dropped while stirring slowly for 30 minutes to neutralize a carboxylic acid group to obtain a mixture containing a water-soluble acryl-modified nonylphenol-modified epoxy resin as a "water-soluble acryl-modified nonylphenol-modified epoxy resin composition".

In addition, 260 kg of deionized water was further dropped to the water-soluble acryl-modified nonylphenol-modified epoxy resin composition under stirring for 30 minutes, and further stirred for 1 hour to obtain a diluted mixture. 3.7 kg of Cymel as a melamine resin was dropped thereto for 10 minutes, aged for 3 hours, and then the temperature was lowered to room temperature.

In the composition containing the water-soluble acryl-modified nonylphenol-modified epoxy resin prepared above, the solid content was 37 wt %, and the viscosity was 20 seconds as a result measured at 25° C. with Ford-Cup #4.

Comparative Example 1

Although proceeding in the same manner as in Example 1, in Step 2, the ring-opening reaction of the epoxy group was performed without adding a phenolic compound.

Comparative Example 2

Although proceeding in the same manner as in Example 1, in Step 2, the epoxy group was modified using tributylamine instead of triphenylphosphine.

Comparative Example 3

Although proceeding in the same manner as in Example 1, in Step 1, an acrylic copolymer was prepared using the remaining components except for a butyl acrylate monomer.

Comparative Example 4

Although proceeding in the same manner as in Example 1, in Step 1, a copolymerization reaction time was performed for 4 hours.

Test Example

The water-soluble acryl-modified nonylphenol-modified epoxy resin prepared in Example 1 and Comparative Examples 1 to 4 was cast on an aluminum plate and cured in an oven at 200° C. for 50 seconds to prepare test pieces.

The physical properties of coating films formed on the test pieces were evaluated, and the results were shown in Table 1 below.

peeled off. The number of reciprocations until the coating film was peeled off was recorded.

(2) Pencil Hardness

On the coating film of the test piece, using a hardness test pencil (manufactured by Mitsubishi Co., Ltd.), 5 lines for each hardness were drawn at an angle of 45° with a load of 500 g. The hardness of the pencil when the scratches on the coating film occurred less than 2 times was expressed as the highest grade.

(3) Folding Processability

When the test piece with the coating film was folded in half and 3 kg of a weight was dropped from a height of 50 cm, the degree of peeling and cracking (length) at an area where the test piece was folded was evaluated.

(4) Adhesion

In accordance with KS M5981, 100 grids were formed in the size of 1 mm×1 mm on the coating film of the test piece, and an adhesive tape (3M, #610) was attached and peeled off. Among 100 grids, the adhesion was evaluated by the number of remaining grids in which the coating film was not peeled off.

(5) Sterilizability

The test piece with the coating film was placed in a sterilizer and sterilized at 125° C. for 30 minutes to evaluate whether or not whitening of the coating film occurred.

(6) Acid Resistance

The coating film of the test piece was scratched by cross-cutting, immersed in a 2% citric acid aqueous solution and left at 125° C. for 30 minutes, and then the corrosion state of the coating film was evaluated.

(7) Alkali Resistance

The coating film of the test piece was scratched by cross-cutting, immersed in a NaOH aqueous solution of pH 10 and left at 125° C. for 30 minutes, and then the corrosion state of the coating film was evaluated.

(8) Viscosity

The viscosity was measured as a time when all of the paint flowed down using Ford-Cup #4 while maintaining the temperature of the paint and Ford-Cup at 25° C.

TABLE 1

| Classification | Example 1 | Comparative Example 1 | Comparative Example 2 | Comparative Example 3 | Comparative Example 4 |
|---|---|---|---|---|---|
| Solvent resistance | 100 times | 40 times | 50 times | 35 times | 60 times |
| Pencil hardness | 2H | 2H | 2H | 3H | 2H |
| Folding processibility | ⊙ | Δ | ⊙ | Δ | ⊙ |
| Adhesion | 100/100 | 100/100 | 100/100 | 100/100 | 100/100 |
| Sterilizability | ⊚ | ⊙ | ⊚ | ⊚ | ⊙ |
| Acid resistance | ⊚ | Δ | Δ | Δ | Δ |
| Alkali resistance | ⊚ | Δ | Δ | Δ | Δ |
| Viscosity | 20 seconds | 50 seconds | 80 seconds | 60 seconds | 75 seconds |
| Solid content (%) | 37 | 37 | 37 | 37 | 37 |
| Coating amount (gms) | 12 | 12 | 12 | 12 | 12 |
| Popping phenomenon | ⊚ | X | X | X | X |

In Table 1, ⊚ represented very excellent, ○ represented excellent, Δ represented normal, and X represented poor. In Test Example, the physical properties of the coating film were evaluated as follows.

(1) Solvent Resistance (MEK Resistance)

Gauze No. 12 was overlapped in 4 layers, methylethyl ketone (MEK) was applied, and rubbed up and down under a load of 3 kg until the coating film of the test piece was (9) Solid Content 1.0 g of a paint on a solid content plate was placed in an oven set at 200° C., baked for 10 minutes, and the solid content was measured by a difference in remaining amount.

(10) Coating Amount

The coating amount was measured in GSM unit (g/m²) by measuring the amount (weight) of how much baking-dried paint was applied on a material.

(11) Popping Phenomenon

Small holes or protrusions were visually confirmed in the dried coating film.

So far, the specific embodiments of the preparation method of the water-soluble acryl-modified phenolic-modified epoxy resin according to the present invention, the water-soluble acryl-modified phenolic-modified epoxy resin prepared thereby, and the aqueous paint composition comprising the same have been described, but it will be apparent that various modifications can be made without departing from the scope of the present invention.

Therefore, the scope of the present invention should not be limited to the exemplary embodiments and should be defined by the appended claims and equivalents to the appended claims.

In other words, the exemplary embodiments described above are illustrative in all aspects and should be understood as not being restrictive, and the scope of the present invention is represented by appended claims to be described below rather than the detailed description, and it is to be interpreted that the meaning and scope of the appended claims and all changed or modified forms derived from the equivalents thereof are included within the scope of the present invention.

INDUSTRIAL APPLICABILITY

The present invention can be used in the paint industry, the construction materials industry, and the building industry.

The invention claimed is:

1. A preparation method of a water-soluble acryl-modified phenolic-modified epoxy resin comprising:
   (Step 1) preparing an acrylic resin by copolymerizing 40 to 60 wt % of a (meth)acrylic acid monomer, 5 to 20 wt % of a methyl methacrylate monomer, 5 to 20 wt % of a butyl acrylate monomer and 10 to 30 wt % of a styrenic monomer in the presence of an initiator at 70 to 130° C. for 1.5 hours to 3.5 hours;
   (Step 2) preparing a phenolic-modified epoxy resin by ring-opening reacting a bisphenol A-type epoxy resin with a phenolic compound in the presence of a catalyst;
   (Step 3) preparing an acryl-modified phenolic-modified epoxy resin by ester-reacting the acrylic resin and the phenolic-modified epoxy resin in the presence of a basic catalyst; and
   (Step 4) preparing a water-soluble acryl-modified phenolic-modified epoxy resin by water-solubilizing the acryl-modified phenolic-modified epoxy resin.

2. The preparation method of the water-soluble acryl-modified phenolic-modified epoxy resin of claim 1, wherein in Step 1, the (meth)acrylic acid monomer is at least one selected from the group consisting of acrylic acid, methacrylic acid and crotonic acid, and
   the styrenic monomer is at least one selected from the group consisting of styrene, vinyltoluene, vinylbenzoic acid, ethyl aminostyrene, alpha-methylvinylbenzoic acid, p-vinylbenzenesulfonic acid, and p-vinylbenzenesulfonic acid sodium salt.

3. The preparation method of the water-soluble acryl-modified phenolic-modified epoxy resin of claim 1, wherein in Step 1, 40 to 60 wt % of methacrylic acid, 5 to 20 wt % of methyl methacrylate, 5 to 20 wt % of butyl acrylate and 10 to 30 wt % of styrene are copolymerized.

4. The preparation method of the water-soluble acryl-modified phenolic-modified epoxy resin of claim 1, wherein in Step 1, the acrylic resin has a weight average molecular weight selected in the range of 1,000 to 10,000.

5. The preparation method of the water-soluble acryl-modified phenolic-modified epoxy resin of claim 1, wherein in Step 2, the bisphenol A type epoxy resin has an epoxy equivalent selected from the range of 1,000 to 5,000.

6. The preparation method of the water-soluble acryl-modified phenolic-modified epoxy resin of claim 1, wherein in Step 2, the phenolic compound is at least one selected from the group consisting of phenol, nonylphenol, 3-(dimethylamino)phenol, 2-(methylamino)phenol, 4-(methylmercapto)phenol, 4-(trifluoromethyl)phenol, 4-(benzyloxy)phenol, 3-(trifluoromethyl)phenol, 4-nitro-3-(trifluoromethyl)phenol, 2-(2-hydroxyethoxy)phenol, 4-(2-methoxyethyl)phenol, (dimethylaminoethyl)phenol, 4-(hexyloxy)phenol, 2-(2-phenylethyl)phenol, 4-(octyloxy)phenol, 2-(4-morpholinylmethyl)phenol, 4-(1,1-dimethylhexyl)phenol, 2-(1-pyrrolidinyl)phenol, 2-(benzyloxy)phenol, 4-(1,1-dimethyloctyl)phenol, 4-(2-naphthyl)phenol, 2-(trifluoromethoxy)phenol, and 4-(trifluoromethoxy)phenol.

7. The preparation method of the water-soluble acryl-modified phenolic-modified epoxy resin of claim 1, wherein in Step 2, the phenolic compound is used in an amount of 10 to 50 mol % based on the epoxy equivalent of the bisphenol A type epoxy resin.

8. The preparation method of the water-soluble acryl-modified phenolic-modified epoxy resin of claim 1, wherein in Step 3, the acrylic resin and the phenolic-modified epoxy resin are used in a weight ratio of 40:60 to 5:95 based on the solid content.

9. The preparation method of the water-soluble acryl-modified phenolic-modified epoxy resin of claim 1, wherein in Step 3, a carboxylic acid group derived from the (meth)acrylic acid monomer of the acrylic resin is ester-linked with a hydroxyl group derived from the epoxy group of the phenolic-modified epoxy resin.

10. The preparation method of the water-soluble acryl-modified phenolic-modified epoxy resin of claim 1, wherein in Step 4, the water-solubilizing is performed by adding and neutralizing a base in an amount of 40 to 90 mol % of the residual carboxylic acid.

11. The preparation method of the water-soluble acryl-modified phenolic-modified epoxy resin of claim 1, wherein the base is at least one selected from the group consisting of triethylamine, tripropylamine, tributylamine, N,N-dimethylethanolamine, N, N-diisopropylmethylamine, N, N-diisopropylethylamine, 2-amino-2-methylpropanol, 2-amino-2-ethyl-1,3-propanediol, 2-dimethylamino-2-methylpropanol, pyrrolidine, imidazole, 1-methylimidazole, 1,8-diazabicyclo[5,4,0]unde-7-cene, 1,5-diazabicyclo[4,3,0]non-5-ene, 2-etoxyhexylamine, bis(2-ethylhexyl)amine, tetrabutylphosphonium bromide, dodecyldimethylamine, N,N-dimethylbenzylamine, 2-ethylimidazole, tetramethylguanidine, benzyltrimethylammonium bromide, benzyltrimethylammonium hydroxide, and tetrabutylammonium hydroxide.

12. A water-soluble acryl-modified phenolic-modified epoxy resin prepared according to the preparation method of the water-soluble acryl-modified phenolic-modified epoxy resin of claim 1.

13. An aqueous coating composition comprising the water-soluble acryl-modified phenolic-modified epoxy resin of claim 12.

14. The aqueous coating composition of claim 13, wherein the aqueous coating composition is applied to an inner surface or inner and outer surfaces of a can lid.

* * * * *